(12) United States Patent
Fu et al.

(10) Patent No.: US 9,648,008 B2
(45) Date of Patent: May 9, 2017

(54) TERMINAL IDENTIFICATION METHOD, AND METHOD, SYSTEM AND APPARATUS OF REGISTERING MACHINE IDENTIFICATION CODE

(71) Applicant: Alibaba Group Holding Limited, Grand Cayman (KY)

(72) Inventors: Yingfang Fu, Beijing (CN); Yudong Zhang, Hangzhou (CN); Zhenyuan Zhang, Hangzhou (CN); Jian Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1 day.

(21) Appl. No.: 14/287,930

(22) Filed: May 27, 2014

(65) Prior Publication Data

US 2014/0351912 A1 Nov. 27, 2014

(30) Foreign Application Priority Data

May 27, 2013 (CN) .......................... 2013 1 0200130

(51) Int. Cl.
*G06F 15/16* (2006.01)
*H04L 29/06* (2006.01)
(Continued)

(52) U.S. Cl.
CPC .......... *H04L 63/0823* (2013.01); *G06F 21/44* (2013.01); *H04L 9/3263* (2013.01)

(58) Field of Classification Search
CPC .... H04L 63/0823; H04L 9/3263; G06F 21/44
See application file for complete search history.

(56) References Cited

U.S. PATENT DOCUMENTS

2005/0102522 A1 5/2005 Kanda
2005/0220304 A1 10/2005 Lenoir et al.
(Continued)

FOREIGN PATENT DOCUMENTS

CN 103024090 A 4/2013
EP 2506525 10/2012

OTHER PUBLICATIONS

PCT Search Report and Written Opinion mailed Oct. 2, 2014 for PCT Application No. PCT/US14/39590, 9 Pages.

*Primary Examiner* — Mohammed Waliullah
(74) *Attorney, Agent, or Firm* — Lee & Hayes, PLLC (57) ABSTRACT

A terminal identification method, a machine identification code registration method and related system and apparatus are disclosed. After receiving a first request for which signature or certificate verification is to be performed from a terminal, a service network obtains a signature or certificate of a trusted party for a machine identification code identifier of the terminal from the first request, wherein the machine identification code identifier being an identifier allocated by the trusted party to the machine identification code of the terminal. The service network verifies the obtained signature or certificate, and if a verification result indicates legitimacy, identifies the terminal using the machine identification code identifier obtained from the signature or certificate. The present disclosure further provides a trusted party and a method of registering a machine identification code by the trusted party. The present scheme can efficiently realize terminal identification, occupy fewer resources and facilitate better privacy protection.

15 Claims, 7 Drawing Sheets

(51) Int. Cl.
*G06F 21/44* (2013.01)
*H04L 9/32* (2006.01)

(56) References Cited

U.S. PATENT DOCUMENTS

| | | |
|---|---|---|
| 2008/0184029 A1 | 7/2008 | Sims et al. |
| 2009/0060187 A1 | 3/2009 | Doyle et al. |
| 2010/0303230 A1 | 12/2010 | Taveau et al. |
| 2011/0007895 A1 | 1/2011 | Wysocki et al. |
| 2012/0100832 A1 | 4/2012 | Mao et al. |
| 2013/0147511 A1 | 6/2013 | Koeberl et al. |
| 2013/0318343 A1* | 11/2013 | Bjarnason ............ H04L 41/0809 713/157 |
| 2014/0129815 A9 | 5/2014 | Shah et al. |
| 2014/0189890 A1 | 7/2014 | Koeberl et al. |
| 2014/0359741 A1* | 12/2014 | Kistner ............... H04L 63/0823 726/7 |

* cited by examiner

FIG. 7

TERMINAL IDENTIFICATION METHOD, AND METHOD, SYSTEM AND APPARATUS OF REGISTERING MACHINE IDENTIFICATION CODE

CROSS REFERENCE TO RELATED PATENT APPLICATION

This application claims foreign priority to Chinese Patent Application No. 201310200130.5 filed on May 27, 2013, entitled "Terminal Identification Method, and Method, System and Apparatus of Registering Machine Identification Code", which is hereby incorporated by reference in its entirety.

TECHNICAL FIELD

The present disclosure relates to a terminal identification technology, and particularly, relates to methods and associated networks of identifying a terminal based on a machine identification code.

BACKGROUND

Along with the continuous development of society, the Internet has developed rapidly and has become an indispensable part of our daily lives. Thousands of people make online purchases and browse news, etc., daily. In an existing computer network, a user may register many different IDs on websites, and log into different service networks for performing different tasks. Determining which terminals are used by these IDs for login is very crucial for efficiently performing business control, user management, risk control and commercial intelligent analysis.

Accordingly, a number of terminal identification technologies have emerged in existing technologies. Existing identification technologies basically collect data associated with a terminal used by a user when the user accesses a service network (such as a website or a platform), and determine a terminal from which the data originates based on this data using servers or computers in the network. A most widely adopted of which is to use a control component associated with a browser to obtain a MAC address for achieving identification. However, MAC addresses are obtained from a registration list, and are prone to tampering and forgery by people. Therefore, there exists a problem of inaccuracy or even falsity of an MAC address so obtained.

A Chinese patent publication with a publication number CN103024090A discloses a different method and system for terminal identification. This method uses software information associated with a browser or hardware information obtained from a hardware IO layer of a terminal as a machine identification code of the terminal, and identifies the terminal based on this machine identification code. During identification, the terminal fetches a machine identification code thereof for sending to a service network. The service network matches the machine identification code to data information associated with different terminals that is stored in a database, and regards a best-matched terminal as an identified terminal.

This machine-identification-code-based terminal identification method obtains hardware information from a hardware IO layer, which is more accurate and more difficult to be intercepted and tampered with as compared to a MAC address. However, as a terminal needs to fetch a machine identification code during each request, and a service network needs to compute degrees of matching of the machine identification code with data information of terminals in a database during identification, this method consumes a large amount of communication and computation resources, and thus deteriorates the user experience. Furthermore, the fetched machine identification code is prone to decompilation, interception and breaching during processes of transmission and storage, thus being unfavorable to privacy protection of an identification code of a user machine.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

A technical problem to be solved by the present disclosure is to provide a terminal identification method, an associated service network and a terminal that occupy fewer resources and facilitate better privacy protection.

In order to solve this problem, the present disclosure provides a terminal identification method which includes:

a service network receiving, from a terminal, a first request for which signature or certificate verification is to be performed;

the service network obtaining a signature or certificate of a trusted party for a machine identification code identifier of the terminal from the first request, wherein the machine identification code identifier is an identifier allocated by the trusted party to the machine identification code of the terminal; and the service network verifying the obtained signature or certificate, and if a verification result indicates legitimacy, identifying the terminal using the machine identification code identifier obtained from the signature or certificate.

In one embodiment, the first request includes an anonymous login request and/or a real-name login request.

In some embodiments, after the service network identifies the terminal using the machine identification code identifier obtained from the signature or certificate, the method further includes:

if the service network allows the terminal to log in and establishes a session with the terminal, the service network records a correspondence relationship between the session and the machine identification code identifier; and the service network identifies subsequent requests that are received via the session as requests sent from the terminal of the machine identification code identifier.

In one embodiment, if the service network does not obtain the signature or certificate from the first request, the service network initiates a registration process for the terminal machine identification code according to the following approach:

the service network informs the terminal to report the machine identification code thereof, submits the machine identification code reported by the terminal to the trusted party for registration, and sends a signature or certificate issued by the trusted party to the terminal for storage; or the service network prompts the terminal to submit the machine identification code thereof to the trusted party for registration through an interface of machine identification code registration provided by the network to obtain and store the signature or certificate issued by the trusted party.

In some embodiments, the registration process of the terminal machine identification code further includes:

the terminal submitting user information of a user and the machine identification code thereof to the trusted party for registration directly or via the service network, wherein the signature or certificate issued by the trusted party includes a user identifier of the user and the machine identification code identifier of the terminal as information associated with the signature.

In one embodiment, the service network or the trusted party sending the signature or certificate to the terminal for storage, includes:

sending the signature or certificate to the terminal for storage as a parameter to be included in the request sent by the terminal to the service network.

Additionally, the terminal identification method further includes:

storing the machine identification code identifier of the terminal and a corresponding machine identification code or a derivative code thereof in a database;

the service network receiving, from the terminal, a second request for which verification of the machine identification code is to be performed;

the service network obtains the machine identification code of the terminal and the signature or certificate from the second request, and after verifying that the signature or certificate is legitimate, queries the corresponding machine identification code or the derivative code in the database based on the machine identification code identifier obtained from the signature or certificate; and if the machine identification code or a derivative code obtained from the second request is different from the machine identification code or the derivative code that are found in a query, declining the request.

In one embodiment, each request sent from the terminal is the second request; or the second request includes one or more of the following requests:

a real-name login request;

an anonymous login request;

a request having a security level higher than a predefined security level;

a request of which a machine identification code is set for verification based on a randomized algorithm; and a request of which a machine identification code is set for verification according to a test cycle.

Correspondingly, the present disclosure further provides a terminal identification system of a service network, which includes:

a receiving module used for receiving requests from a terminal;

a first verification module used for, after the receiving module receives a first request for which signature or certificate verification is to be performed from the terminal, obtaining and verifying a signature or certificate of a trusted party for a machine identification code identifier of the terminal from the first request, wherein the machine identification code identifier is an identifier allocated by the trusted party to the machine identification code of the terminal; and an identification module used for identifying the terminal using the machine identification code identifier obtained from the signature or certificate when a verification result of the first verification module indicates legitimacy.

In one embodiment, the first request received by the receiving module includes an anonymous registration request and/or a real-name registration request.

In some embodiments, after the identification module identifies the terminal using the machine identification code identifier obtained from the signature or certificate, if the terminal successfully logs in and establishes a session with the service network, a correspondence relationship between the session and the machine identification code identifier is recorded, and subsequent requests received via the session are identified as requests sent from the terminal having the machine identification code identifier.

In one embodiment, the system further includes: a registration initialization module used for initializing a registration process of the terminal machine identification code when the first verification module does not obtain the signature or certificate from the first request according to the following approach:

informing the terminal to report the machine identification code thereof, submitting the machine identification code reported by the terminal to the trusted party for registration, and sending a signature or certificate issued by the trusted party to the terminal for storage; or prompting the terminal to submit the machine identification code thereof to the trusted party for registration through an interface of machine identification code registration provided by the network to obtain the signature or certificate issued by the trusted party for storage.

In some embodiments, the registration initiating module sending the signature or certificate issued by the trusted party to the terminal for storage includes sending the signature or certificate to the terminal for storage as a parameter to be included in the request sent by the terminal to the service network.

In one embodiment, the first verification module is further used for, after the receiving module receives a second request for which machine identification code verification is to be performed from the terminal, verifying a signature or certificate thereof.

The terminal identification system further includes:

a database used for storing the machine identification code identifier of the terminal and a corresponding machine identification code or a derivative code thereof;

a second verification module used for querying the corresponding machine identification code or the derivative code in the database according to the machine identification code identifier obtained from the signature or certificate when the first verification module confirms that the signature or certificate in the second request is legitimate, determining whether the machine identification code or the derivative code obtained from the second request is the same as the machine identification code or the derivative code that is found in a query, and setting a verification result of the machine identification code to indicate legitimacy if the same, or illegitimacy otherwise; and an access control module used for denying the request when a determination result of the second verification module indicates a difference.

In one embodiment, each request sent by the terminal is a second request; or the second request includes one or more of the following requests:

a real-name login request;

an anonymous login request;

a request having a security level higher than a predefined security level;

a request of which a machine identification code is set for verification based on a randomized algorithm; and a request of which a machine identification code is set for verification according to a test cycle.

In the foregoing scheme, a service network identifies a terminal based on a machine identification code identifier in a signature or certificate that is reported by the terminal, without the need of performing matching. Furthermore, the terminal does not need to fetch and transmit the machine identification code every time, thus avoiding counterfeiting of the machine identification code and saving communication and computational resources. In addition, since a machine identification code identifier (which only the service network knows), instead of a machine identification code, is what a terminal stores and transmits, privacy protection for the user machine identification code is enhanced.

Another technical problem to be solved by the present disclosure is to provide a registration method of a machine identification code of a terminal and a corresponding trusted party.

In order to solve this problem, the present disclosure provides a registration method of a machine identification code of a terminal, for application in a trusted party, which includes:

receiving a registration request, the registration request including a machine identification code of a terminal;

verifying the machine identification code, and allocating a machine identification code identifier to the machine identification code if verified to be legitimate; and conducting a signature for information that includes the machine identification code identifier, and sending the signature or a certificate including the signature to a requesting party of the registration request.

In one embodiment, the registration request further includes user information of a user who uses the terminal.

The Method Further Includes:

verifying the user information, and if verified to be legitimate, conducting the signature for a user identifier and the machine identification code identifier together, the user identifier being obtained from the user information or being allocated according to the user information.

Correspondingly, the present disclosure further provides a trusted party, which includes:

a receiving module configured to receive a registration request, the registration request including a machine identification code of a terminal;

a verification module configured to verify the machine identification code;

an allocation module configured to allocate a machine identification code identifier to the machine identification code when a verification result of the verification module indicates legitimacy; and an issuing module configured to conduct a signature for information containing the machine identification code identifier, and send the signature or a certificate containing the signature to a requesting party of the registration request.

In one embodiment, the registration request received by the receiving module further includes user information of a user who uses the terminal.

The verification module verifies the user information and the machine identification code simultaneously.

The issuing module conducts the signature for a user identifier and the machine identification code identifier, the user identifier being obtained from the user information or being allocated according to the user information.

The foregoing scheme realizes an allocation of a machine identification code identifier of a terminal and an issuance of a corresponding signature or certificate, which can be applied to prove the authenticity of the machine identification code identifier of the terminal. Verification of machine identification codes of terminals can reject a registration of an illegitimate terminal, and improve the credibility of the terminals.

DETAILED DESCRIPTION

In order to have a better understanding of the purpose, technical schemes, benefits and embodiments of the present disclosure will be described in detail with reference to the accompanying drawings. It should be noted that the embodiments of the present disclosure and features in the embodiments may be mutually and arbitrarily combined when no conflict exists.

In a typical configuration of the present disclosure, a terminal, an apparatus associated with a service network and a trusted party may include one or more of central processing units (CPU), input/output interfaces, network interfaces and internal storage.

The internal storage may include a form of computer readable media, e.g., a non-permanent storage device, random-access memory (RAM) and/or a nonvolatile internal storage, such as read-only memory (ROM) or flash RAM. The internal storage is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

First Embodiment

A system of this embodiment includes a terminal, a service network and a trusted party. The terminal may be a user device, e.g., a PC, a smartphone, PDA, etc. The service network is used for providing a network service to the terminal, and may include one or more of website systems or network platforms, for example. The service network may identify a terminal that sent a request. The trusted party is used for allocating a machine identification code identifier to a machine identification code of a terminal and issuing a signature or certificate. It should be noted that the trusted party may be a node in the service network, or a node outside the service network.

Figure 1:
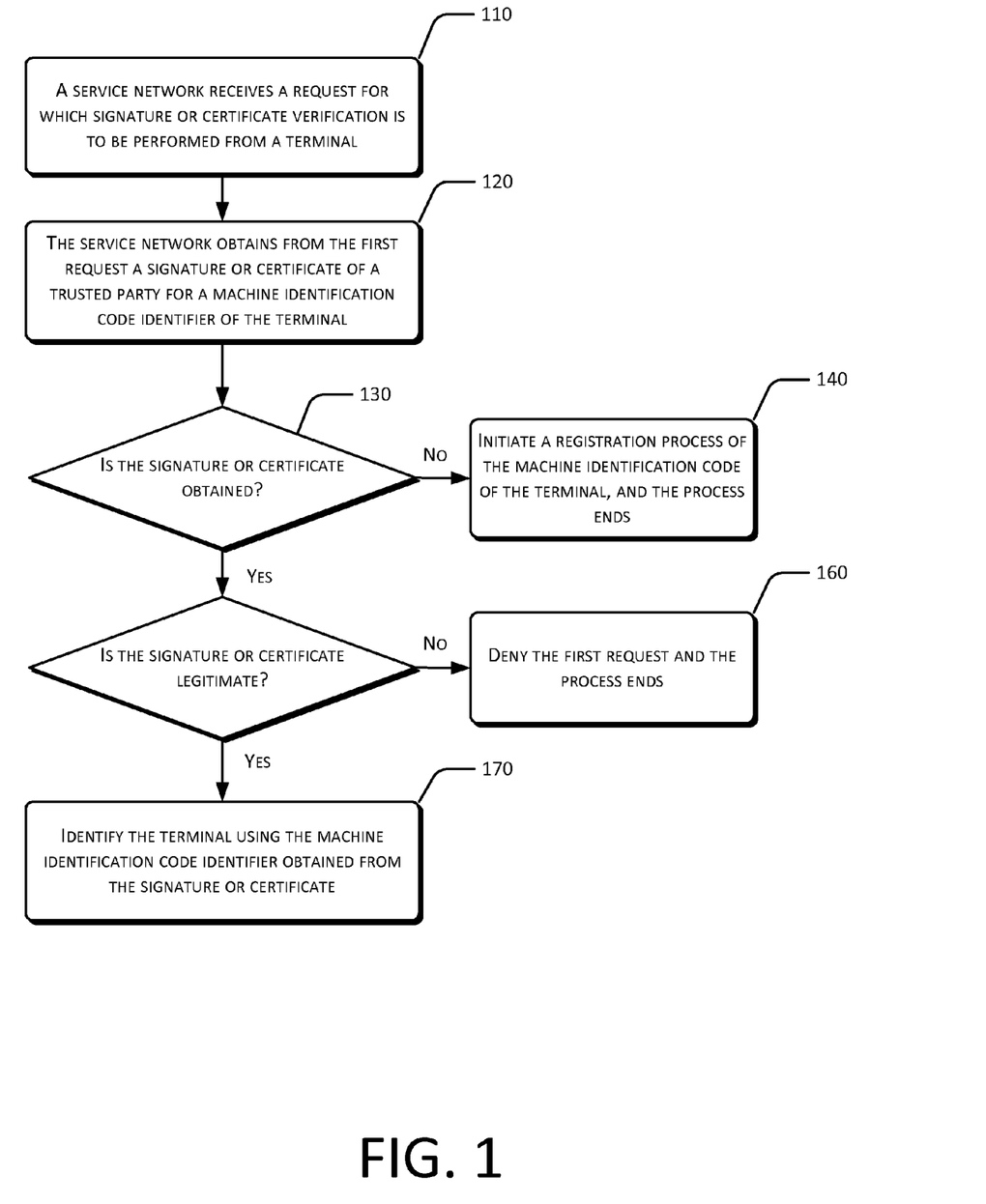
FIG. 1 is a flowchart of a method of terminal identification in accordance with a first embodiment of the present disclosure.

As shown in FIG. 1, a method of terminal identification in the present embodiment includes:

At block 110, the service network receives a first request of which signature or certificate verification is to be performed from the terminal.

A first request of which signature or certificate verification is to be performed is defined by the service network, and may include, for example, an anonymous login request and/or a real-name login request, and may also include other requests, which are not be limited in this disclosure. When the first request includes an anonymous login request, the service network identifies a terminal when a user anonymously logs in, and so computes statistics for activities associated with the terminal under a status of anonymous login.

At block 120, the service network obtains a signature or certificate of the trusted party for a machine identification code identifier of the terminal from the first request. The machine identification code identifier is an identifier allocated by the trusted party to the machine identification code of the terminal.

The machine identification code in this embodiment includes hardware and/or software information that can uniquely identify the terminal. The hardware information may include, for example, hardware information obtained from a hardware IO layer of the terminal, and the software information may include, for example, software information of a browser of the terminal, etc.

A signature for a machine identification code identifier of a terminal corresponds to a signature created by a private key of the trusted party for information such as the machine identification code identifier, and may be represented as $sig_{CA}(UMIC\_id)$, where "CA" represents the trusted party, UMIC_id represents the machine identification code identifier of the terminal. Information associated with the signature includes, but is not limited to, the machine identification code, and may further include other information such as a user identifier, etc. A signature including user identification may be represented as $sig_{CA}(UMIC\_id\|User\_id)$, where "User_id" represents a user identifier.

The certificate is a certificate that includes the signature. When the information of the signature includes UMIC_id and User_id, the certificate may be represented as:

---
Certificate version number
Certificate sequence number
UMIC_id

---
User_id
$sig_{CA}(UMIC\_id \| User\_id)$
Time stamp

---

Remark: The above table only shows parts of the information included in the certificate. The certificate may comply with X.509 standard but is not limited thereto.

At block 130, a determination is made as to whether the signature or certificate is obtained. If obtained, block 150 is executed. Otherwise, block 140 is executed.

At block 140, a registration process of the machine identification code of the terminal is initiated. The process ends.

In this embodiment, if the service network does not obtain the signature or certificate from the first request, a registration process of the terminal machine identification code is initiated according to the following approach: the service network informing the terminal to report a machine identification code thereof, submitting the machine identification code reported by the terminal to the trusted party for registration, and sending a signature or certificate issued by the trusted party to the terminal for storage. In other embodiments, the service network may prompt the terminal to submit its own machine identification code to the trusted party for registration through an interface of machine identification code registration provided by the network, and to obtain and store a signature or certificate issued by the trusted party.

In one embodiment, in the registration process, the service network or the trusted party may send the signature or certificate to the terminal for storage as a parameter to be included in the request sent from the terminal to the service network, e.g., sending as a parameter in a Cookie to the terminal.

It should be noted that the present disclosure has no limitation on how to initiate registration of a machine identification code of a terminal. Other than the above two approaches, the terminal may voluntarily register to the trusted party when such signature or certificate has not been obtained, without the need of the service network to initiate the registration when the request does not include a signature or certificate.

At block 150, verification is performed for the signature or certificate. If a verification result indicates legitimacy, block 170 is executed. Otherwise, block 160 is executed.

In this block, the service network decrypts the signature using a public key of the trusted party to achieve verification of the signature. Verification of the certificate may employ an existing certificate verification method, e.g., adding verification about an effective term of the certificate or whether the certificate exists in a certificate database.

The verification of the signature or certificate ensures the machine identification code identifier to be a machine identification code identifier actually allocated by the trusted party, and effectively prevents an illegitimate user to counterfeit or tamper the machine identification code.

At block 160, the first request is denied. The process ends.

If a verification result of the signature or certificate indicates illegitimacy, indicating that the terminal has not obtained a legitimate signature or certificate from the trusted party, the first request may be denied at this time. When denying the first request, the registration process of the machine identification code of the terminal at block 140 may be initiated based on design needs.

At block 170, the terminal is identified using the machine identification code identifier that is obtained from the signature or certificate.

Using a machine identification code identifier for identifying a terminal implies that terminals having a same machine identification code identifier are identified as a same terminal. Therefore, statistics of times and number of times associated with requests sent by the same terminal may be accurately computed, which may be used for deciding whether the terminal is allowed to access a network service.

For requests other than the first request, the service network may or may not perform terminal identification. In one example embodiment, as a terminal in one session is difficult to be altered, a correspondence relationship between a session and the machine identification code identifier may be recorded if the service network allows the terminal to log in and establishes the session with the terminal after block 170. Subsequent requests received via the session are identified as requests sent by the terminal having the machine identification code identifier, thus saving computational resources. Alternatively, in another embodiment, each request sent from the terminal may be treated as a first request, from which a signature or certificate is obtained for verification in order to achieve a more reliable identification.

Figure 2:
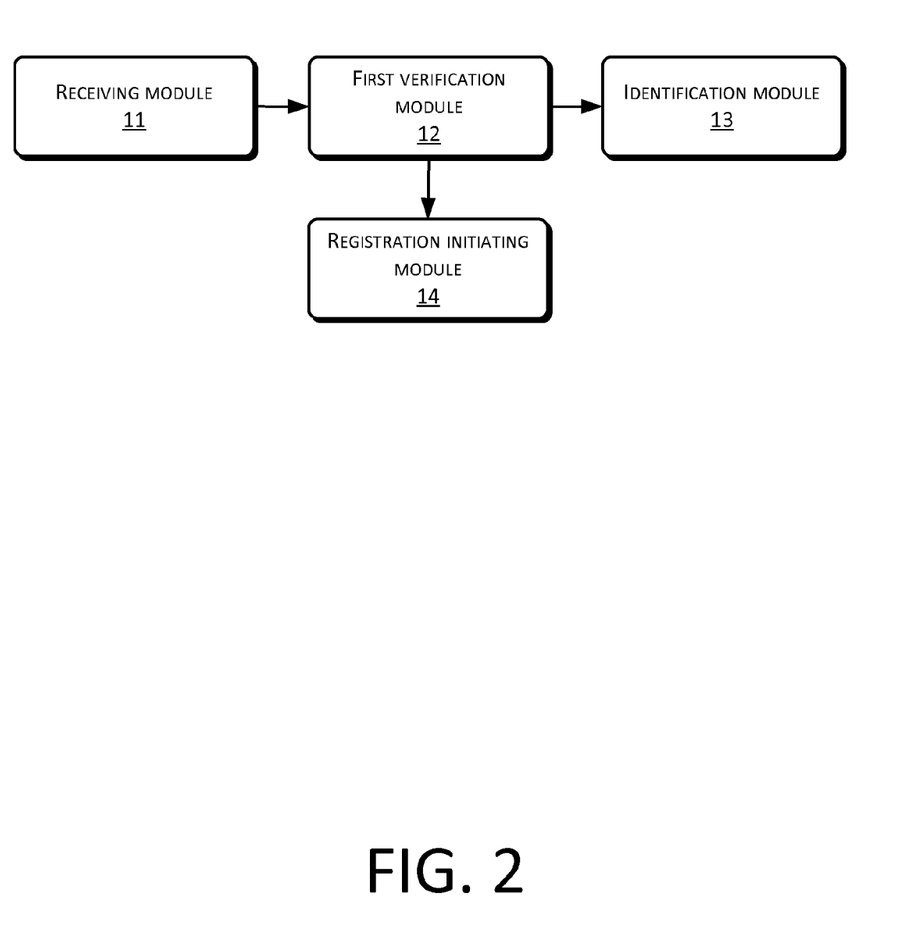
FIG. 2 is a functional diagram of a system of terminal identification in accordance with the first embodiment of the present disclosure.

The service network may employ a terminal identification system as shown in FIG. 2 to implement the above terminal identification method. The identification system includes:

A receiving module 11 is used for receiving requests from a terminal.

A first verification module 12 is used for, after the receiving module receiving a first request for which signature or certificate verification is to be performed from the terminal, obtaining and verifying a signature or certificate from a trusted party for a machine identification code identifier of the terminal from the first request, where the machine identification code identifier is an identifier allocated by the trusted party to a machine identification code of the terminal. In one embodiment, the first request received by the receiving module includes an anonymous login request and/or a real-name login request.

An identification module 13 is used for identifying the terminal using the machine identification code identifier obtained from the signature or certificate when a verification result of the first verification module indicates legitimacy. After the terminal successfully logs in and establishes a session with the service network, the identification module may record a correspondence relationship between the session and the machine identification code identifier, and treat subsequent requests received via the session as requests sent from the terminal having the machine identification code identifier.

A registration initiating module 14 (which is optional) is used for initiating a registration process of the terminal machine identification code when the first verification module does not obtain the signature or certificate from the first request using the following approach: notifying the terminal to report the machine identification code thereof, submitting the machine identification code reported by the terminal to the trusted party for registration, and sending the signature or certificate issued by the trusted party to the terminal for storage, wherein the signature or certificate is in one embodiment sent to the terminal for storage as a parameter to be included in a request sent from the terminal to the service network; or prompting the terminal to submit the machine identification code thereof to the trusted party for registration through an interface of machine identification code registration provided by the network and to obtain and store the signature or certificate issued by the trusted party.

During implementation, the above modules may be distributed in different entities, or may be distributed within a same entity.

Figure 3:
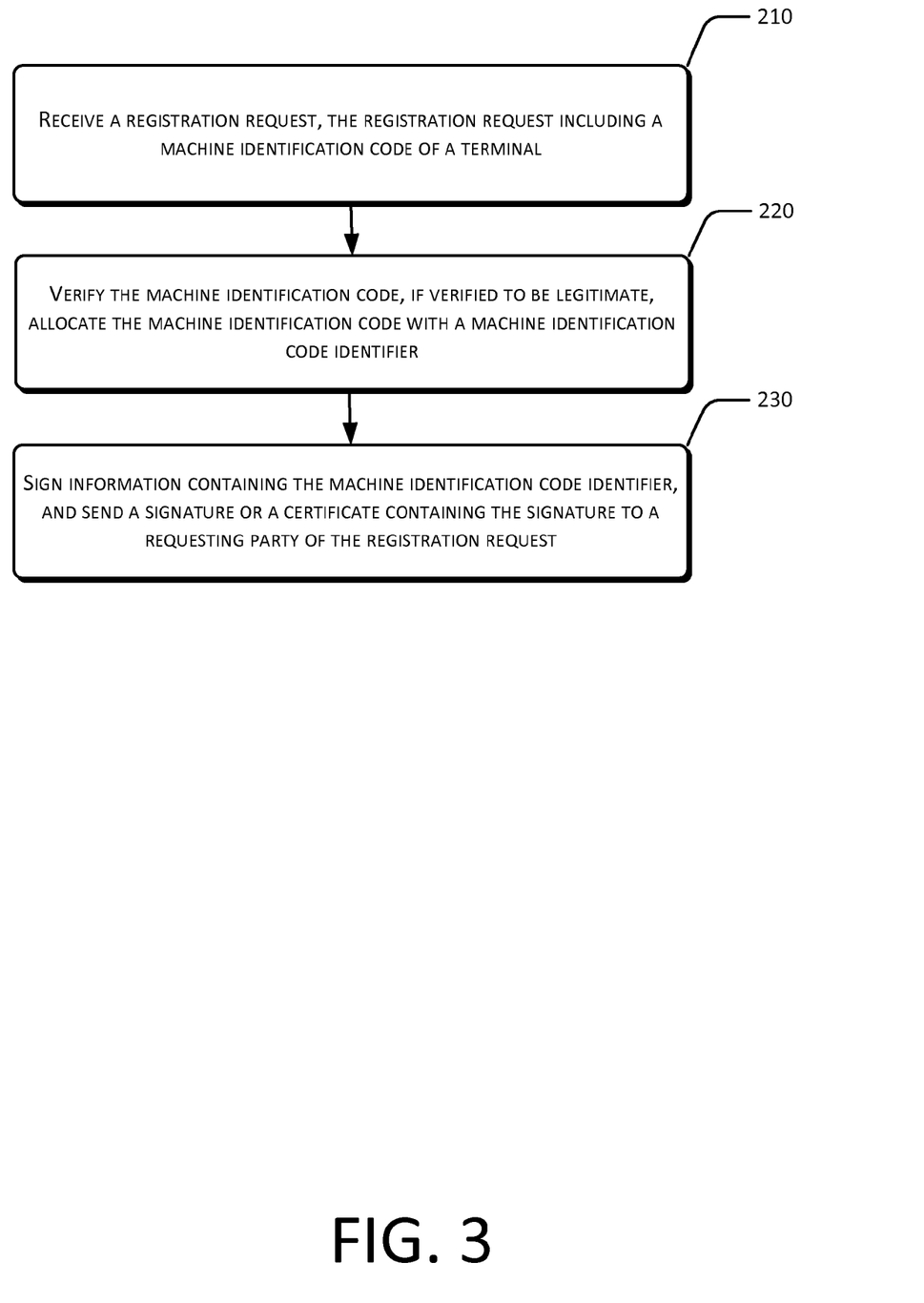
FIG. 3 is a flowchart of a registration method of a machine identification code of a terminal in accordance with the first embodiment of the present disclosure.

Correspondingly, as shown in FIG. 3, a method of registering a machine identification code of a terminal by the trusted party includes:

Block 210 receives a registration request, the registration request including a machine identification code of a terminal.

Block 220 verifies the machine identification code, and if verified to be legitimate, allocates a machine identification code identifier to the machine identification code.

Here, verification of a machine identification code may be, for example, examining legitimacy of a universal apparatus, such as checking whether a hard disk is an apparatus of a real manufacturer through a sequence number, etc. It should be noted that verification at this place is optional for terminal identification. However, additional verification may reject registration of an illegitimate terminal, and thus increase the credibility of terminals.

Block 230 conducts a signature for information containing the machine identification code identifier, and sends the signature or a certificate containing the signature to a party of the registration request.

Figure 4:
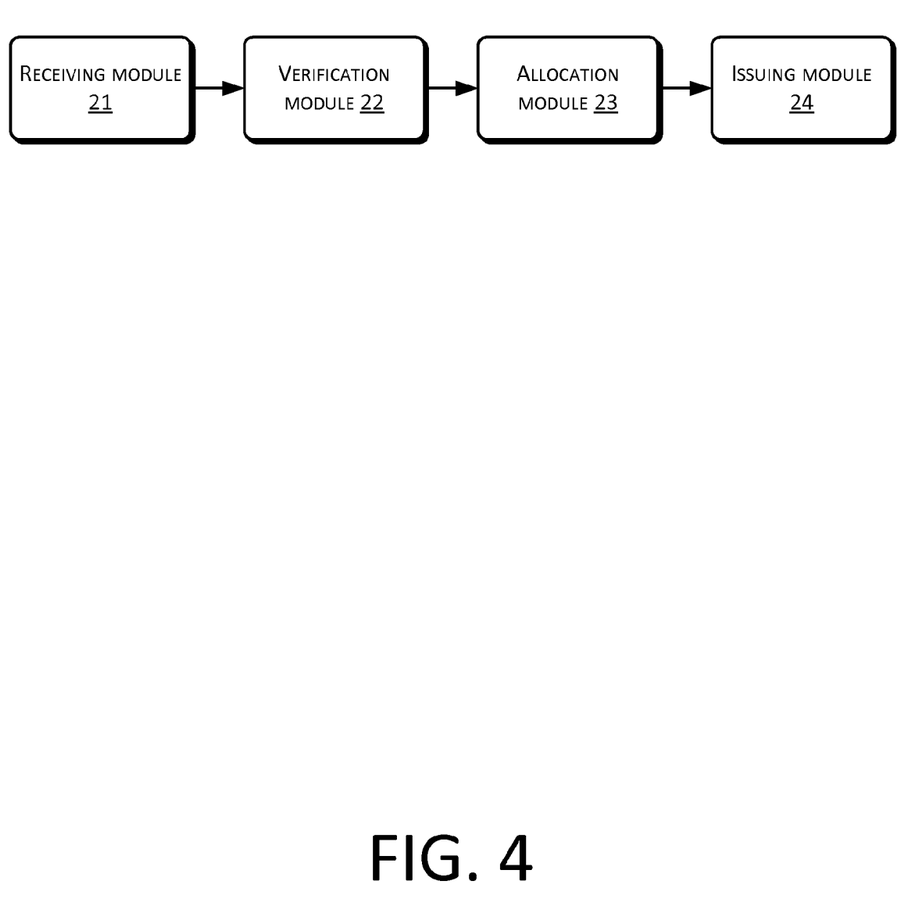
FIG. 4 is a functional diagram of a trusted party in accordance with the first embodiment of the present disclosure.

As shown in FIG. 4, the trusted party includes:

a receiving module 21 configured to receive a registration request, the registration request including a machine identification code of a terminal;

a verification module 22 configured to verify the machine identification code;

an allocation module 23 configured to allocate a machine identification code identifier to the machine identification code when a verification result of the verification module indicates legitimacy; and an issuing module 24 configured to sign information containing the machine identification code identifier and sends a signature or a certificate containing the signature to a party of the registration request.

When the received registration request further includes user information of a user that uses the terminal, the verification module performs verification for both the user information and the machine identification code. The issuing module conducts a signature for both a user identifier and the machine identification code identifier, where the user identifier is obtained from the user information or is allocated according to the user information.

By the same token, the above verification module is optional. Under a circumstance when the verification module is not included, the allocation module may directly allocate the machine identification code identifier to the machine identification code that is included in the registration request. Furthermore, it should be noted that the above modules included in the trusted party may be located in one entity, or may be distributed in different entities. The trusted party is a logical entity made up of modules that implement these functions.

In the above embodiment, the machine identification code is not bound to the user identifier, and is prone to attacks that replace the machine identification code. For example, after a second terminal separately establishes security channels with a first terminal and a third terminal among users, the second terminal sends a machine identification code received from the first terminal to the third terminal as its own machine identification code, and the third terminal cannot identify that this machine identification code sent from the second terminal is not a machine code of the second terminal. Therefore, based on the above embodiment, the terminal may in one embodiment submit user information of a user and its own machine identification code to the trusted party for registration directly or through the service network during the registration process of the terminal machine identification code, where the user information may be inputted by the user or stored locally. When the registration request includes the user information, the trusted party may verify the user information during registration. If verification indicates legitimacy, a user identifier and the machine identification code identifier are taken as information to be signed for conducting signature. The user identifier may be obtained from the user information or allocated according to the user information. As such, the user identifier and the machine identification code identifier are bound together in the signature or certificate, thus effectively avoiding the above attacks of replacing the machine identification code.

Second Embodiment

The service network in the first embodiment treats a machine identification code identifier as an identifier of a terminal, realizing identification of the terminal. However, an illegitimate user may store a large number of signatures or certificates issued by the trusted party in a same machine, similar to an existing junk account storing a large number of junk signatures or certificates, with a difference being a higher cost as compared to registration of the existing junk account. Requests are sent to the service network through a malicious program, and different signatures or certificates are used in different requests. In this case, the service network cannot realize effective identification of a terminal. Therefore, the present embodiment adds a verification process of a machine identification code on top of the first embodiment.

In this embodiment, a machine identification code identifier and a corresponding machine identification code or a derivative code thereof are needed to be stored in a database. Specifically, the trusted party may store and maintain a machine identification code of a terminal and a machine identification code identifier allocated thereby correspondingly in a database. Alternatively, the trusted party may send the machine identification code of the terminal and the machine identification code identifier to the service network for storage in a database and maintenance by the service network. In order to protect the privacy of the machine identification code of the terminal in a better manner, a derivative code of the machine identification code may substitute the machine identification code and be stored in the database instead. A derivative code of a machine identification code refers to a code obtained based on computation performed for the machine identification code. For example, when a machine identification code includes N-bit hardware information and/or M-bit browser software information, a hash value of the N-bit hardware information and/or M-bit browser software information may be taken as a derivative code of that machine identification code.

Figure 5:
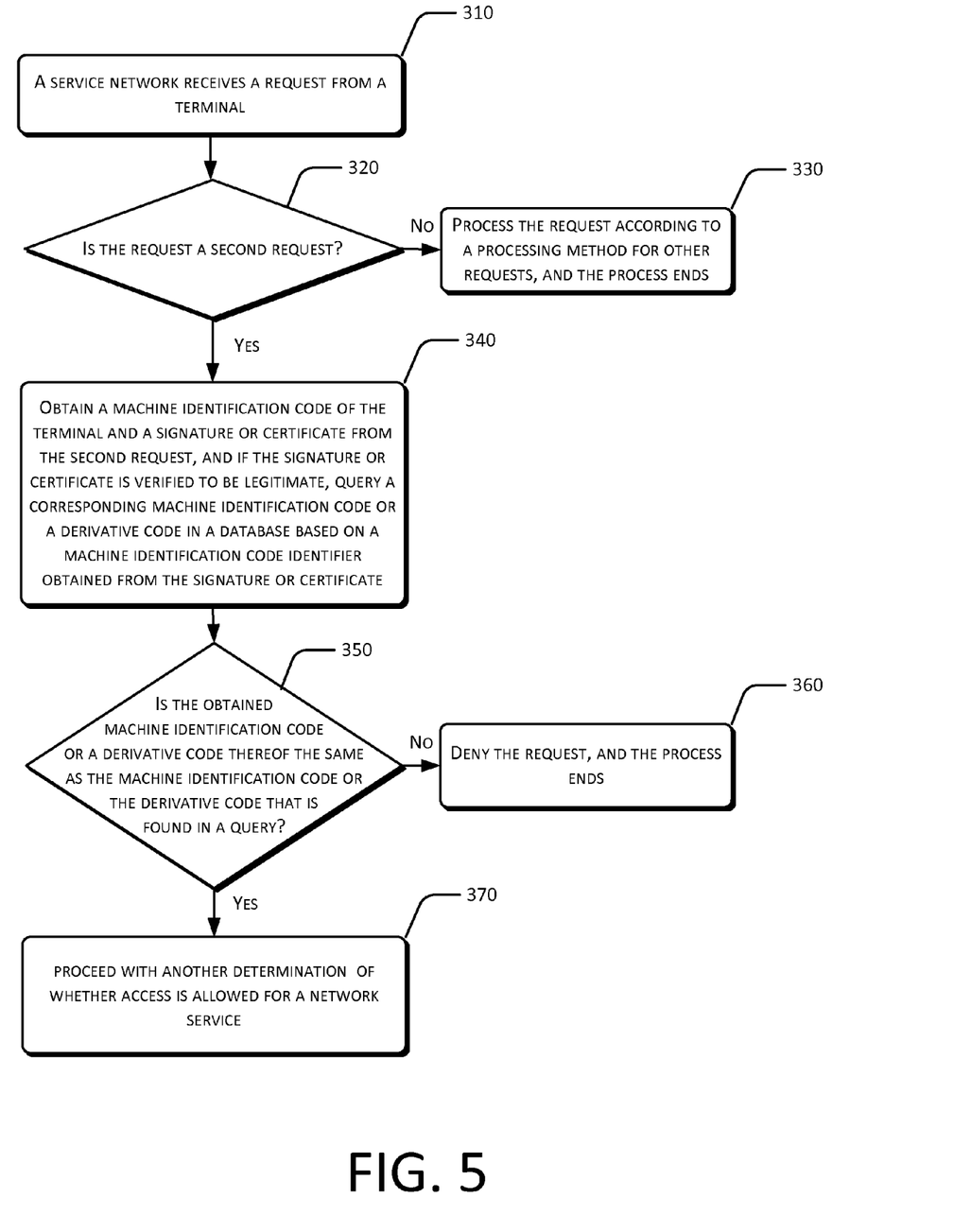
FIG. 5 is a flowchart of a verification method of a machine identification code in accordance with a second embodiment of the present disclosure.

As shown in FIG. 5, a process of verifying a machine identification code in this embodiment includes:

Block 310 receives a request sent from a terminal by the service network.

Block 320 determines whether the received request is a second request that needs machine identification code verification. If not, block 330 is executed. Otherwise, block 340 is executed.

In this embodiment, a second request that needs machine identification code verification is agreed upon by the service network and the terminal in advance, or in other embodiments, may be set by the service network or the terminal. When the second request is set by the terminal, the service network may determine whether a request is a second request by examining whether the request includes a machine identification code and a signature/certificate of the terminal. When the second request is set by the service network, the service network may notify the terminal to report the machine identification code and the signature/certificate. The present disclosure has no limitation as to what requests are taken as a second request.

For example, for a service network having a high security requirement, all requests sent from a terminal may be set as second requests to ensure the credibility of the terminal and improve the security level of a network service.

As another example, the following one or more types of requests may be taken as a second request:
a real-name registration request;
an anonymous registration request;
a request having a security level higher than a predefined security level, such as requests involving payment and transfer between accounts;
a request of which a machine identification code is set for verification based on a randomized algorithm, e.g., the terminal may randomly determine a particular request as a second request;
a request of which a machine identification code is set for verification according to a testing cycle, e.g., after completing one testing, the terminal will not perform testing again within a predetermined time segment, i.e., within a testing cycle, and a request sent after this testing cycle is determined as a second request.

In one embodiment, in a scenario of which a requirement for data security is low, verification of a machine identification code in this embodiment may be skipped.

Block 330 performs processing according to a processing method for other requests. The process ends.

If the request is a first request, verification of a signature or certificate may be performed at this time to identify the terminal. For other request, identification of the terminal may not need to be performed, or the terminal may be identified based on a recorded correspondence relationship between a machine identification code identifier and a session.

Block 340 obtains the machine identification code of the terminal and a signature or certificate from the second request, and if the signature or certificate is verified to be legitimate, queries a corresponding machine identification code or a derivative code thereof from a database based on a machine identification code identifier obtained from the signature or certificate.

Block 350 determines whether the machine identification code or derivative code that is obtained is the same as the machine identification code or derivative code that is found. If not, block 360 is executed. Otherwise, block 370 is executed.

If the database stores machine identification codes, the service network only needs to compare the obtained machine identification code with a corresponding machine identification code in the database. If the database stores derivative codes of the machine identification codes, the service network needs to compute and obtain a derivative code from the obtained machine identification code according to a same algorithm first, and compares that derivative code with a corresponding derivative code in the database.

Block 360 denies this request. The process ends.

After denying the request, no other processing may be performed, or a user may be prompted to perform registration of a machine identification code again. Alternatively, the machine identification code identifier may be set as invalid or illegitimate, and subsequent received requests that include this machine identification code identifier in respective signatures or certificates may all be denied.

Block 370 proceeds to perform another determination regarding an access of a network service.

Here, another determination regarding an access of a network service may be, for example, to compute statistics for intervals and number of times of requests sent from the terminal to determine whether the request of the terminal is sent from a malicious computer program, etc.

It should be noted that, if the second request is also a first request, other processing for the first request needs to be completed, e.g., identifying the terminal based on the machine identification code identifier in the signature or certificate.

In this embodiment, the terminal identification system in the service network adds the following functions and functional modules on top of the first embodiment:

the first verification module is further configured to perform verification of a signature or certificate when the receiving module receives a second request of which a machine identification code needs to be verified from the terminal.

Moreover, the terminal identification system further includes:

a database configured to store a machine identification code identifier of the terminal and a corresponding machine identification code or a derivative code thereof;

a second verification module configured to query the corresponding machine identification code or derivative code in the database according to the machine identification code identifier obtained in the signature or certificate when the first verification module verified the signature or certificate in the second request to be legitimate, determine whether the machine identification code or derivative code obtained from the second request is the same as the machine identification code or derivative code that is found from a query, and set a verification result for the machine identification code as legitimate if the same, or illegitimate otherwise; and an access control module configured to reject the request when the verification result of the second verification module is set as illegitimate.

Figure 6:
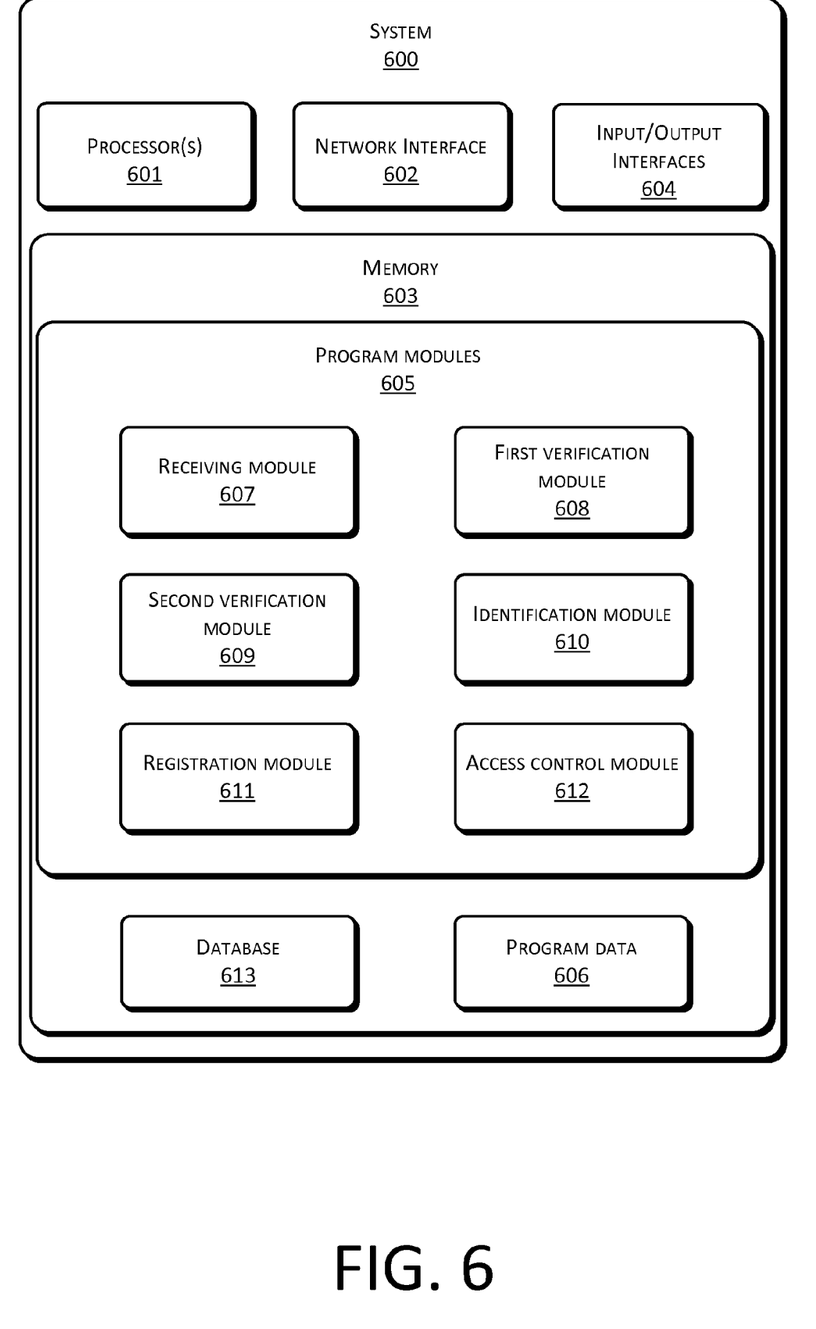
FIG. 6 is a structural diagram of the example system as described in FIG. 2.

FIG. 6 illustrates an example system 600, such as the systems as described above, in more detail. In one embodiment, the system 600 can include, but is not limited to, one or more processors 601, a network interface 602, memory 603, and an input/output interface 604.

The memory 603 may include computer-readable media in the form of volatile memory, such as random-access memory (RAM) and/or non-volatile memory, such as read only memory (ROM) or flash RAM. The memory 603 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 603 may include program modules 605 and program data 606. In one embodiment, the program modules 605 may include a receiving module 607, a first verification module 608, a second verification module 609, an identification module 610, a registration module 611 and an access control module 612. In some embodiments, the memory 603 may further include a database 613. Details about these program modules may be found in the foregoing embodiments described above.

Figure 7:
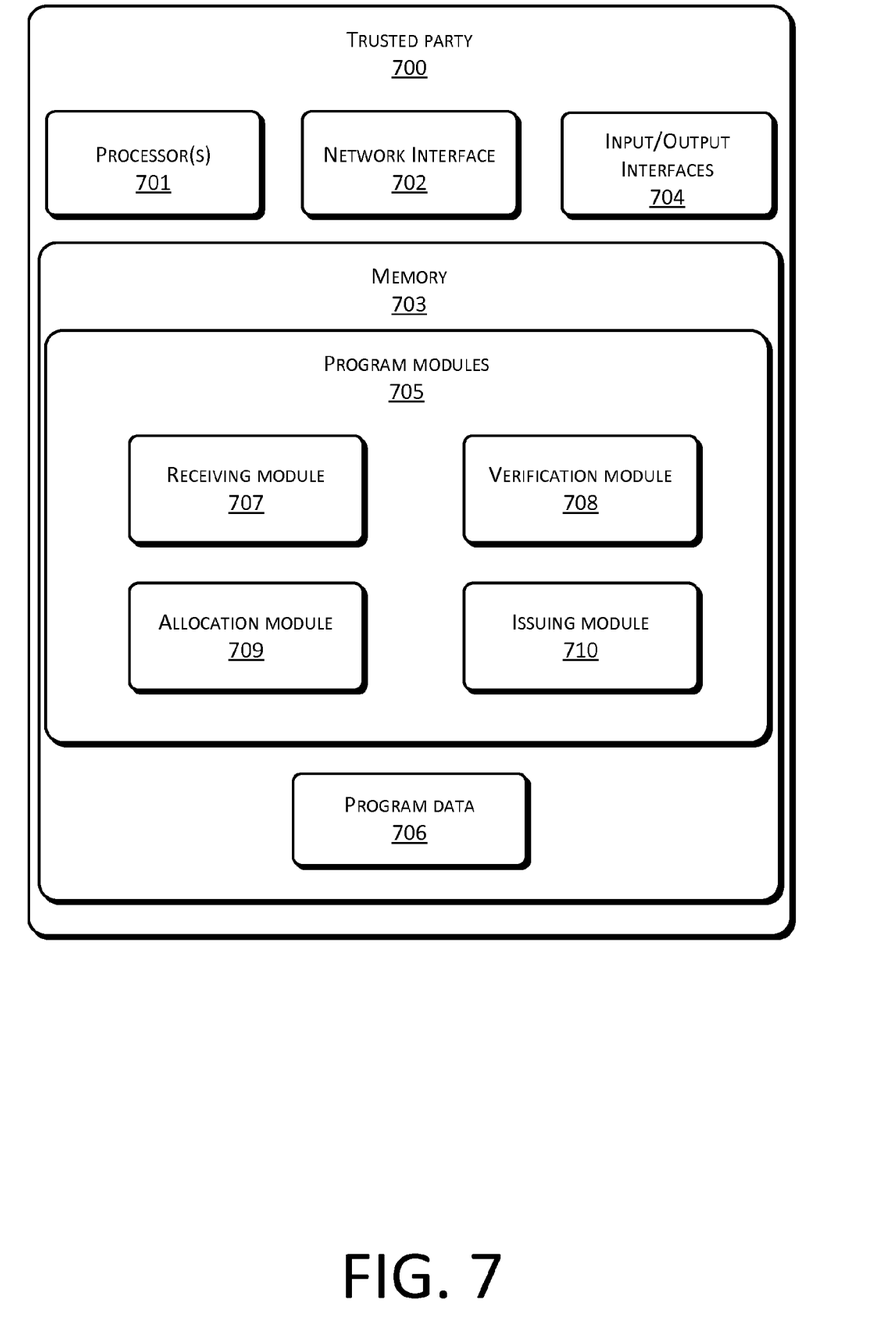
FIG. 7 is a structural diagram of the example trusted party as described in FIG. 4.

FIG. 7 illustrates an example trusted party 700, such as the trusted parties as described above, in more detail. In one embodiment, the trusted party 700 can include, but is not limited to, one or more processors 701, a network interface 702, memory 703, and an input/output interface 704. The memory 703 may include computer-readable media in the form of volatile memory, such as random-access memory (RAM) and/or non-volatile memory, such as read only memory (ROM) or flash RAM. The memory 703 is an example of computer-readable media.

The memory 703 may include program modules 705 and program data 706. In one embodiment, the program modules 705 may include a receiving module 707, a verification module 708, an allocation module 709 and an issuing module 710. Details about these program modules may be found in the foregoing embodiments described above.

A person of ordinary skill in the art can understand that that all or part of the foregoing methods can be performed by a program that instructs a relevant hardware component. The program may be stored in a computer-readable storage medium, such as read-only memory, a magnetic disk, or an optical disk. Optionally, all or part of the foregoing embodiments may be implemented using one or more integrated circuits. Accordingly, each module/unit of the foregoing embodiments may be implemented in form of hardware or software functional modules. The present disclosure is not limited to any particular forms of combination of hardware and software.

Described above are merely preferred embodiments of the present disclosure, and should not be construed as limitation of the present disclosure. For one skilled in the art, the disclosed methods and systems can accommodate a variety of changes and modifications. Any changes, equivalents and improvements, etc., that are within the spirit and principles of the present disclosure, are covered under the protection of the present disclosure.

To be claimed:

1. A terminal identification method comprising:
    receiving by a service network, from a terminal, a first request for which signature or certificate verification is to be performed;
    obtaining by the service network a signature or a certificate of a trusted party for a machine identification code identifier of the terminal from the first request, wherein the machine identification code identifier is an identifier allocated by the trusted party to the machine identification code of the terminal, and wherein the signature or certificate of the trusted party includes a user identifier of the user and the machine identification code identifier of the terminal as information associated with the signature or certificate;

verifying by the service network, the obtained signature or certificate, and if the obtained signature or certificate is verified to be legitimate, identifying the terminal using the machine identification code identifier obtained from the signature or certificate;

storing the machine identification code identifier of the terminal and a corresponding machine identification code or a derivative code thereof in a database;

the service network receiving, from the terminal, a second request of which machine identification code verification is to be performed;

the service network obtaining the machine identification code of the terminal and a signature or certificate from the second request, and after verifying that the signature or certificate is legitimate, querying the corresponding machine identification code or the derivative code in the database based on the machine identification code identifier obtained from the signature or certificate; and if the machine identification code or a derivative code obtained from the second request is different from the machine identification code or the derivative code that are found in a query, declining the request.

2. The method as recited in claim 1, wherein the first request comprises an anonymous registration request and/or a real-name registration request.

3. The method as recited in claim 2, wherein after the service network identifies the terminal using the machine identification code identifier obtained from the signature or certificate, the method further comprises:

if the service network allows the terminal to log in and establishes a session with the terminal, the service network recording a correspondence relationship between the session and the machine identification code identifier; and the service network identifying subsequent requests that are received via the session as requests sent from the terminal of the machine identification code identifier.

4. The method as recited in claim 1, wherein if the service network does not obtain the signature or certificate from the first request, the service network initiating a registration process of the terminal machine identification code by:

the service network informing the terminal to report the machine identification code thereof, submitting the machine identification code reported by the terminal to the trusted party for registration, and sending a signature or certificate issued by the trusted party to the terminal for storage; or the service network prompting the terminal to submit the machine identification code thereof to the trusted party for registration through an interface of machine identification code registration provided by the network to obtain and store the signature or certificate issued by the trusted party.

5. The method as recited in claim 4, wherein the registration process of the terminal machine identification code further comprises:

the terminal submitting user information of a user and the machine identification code thereof to the trusted party for registration directly or via the service network.

6. The method as recited in claim 4, wherein the service network or the trusted party sending a signature or certificate issued by the trusted party to the terminal for storage, comprises:

sending the signature or certificate to the terminal for storage as a parameter to be included in a request sent by the terminal to the service network.

7. The method as recited in claim 1, wherein each request sent from the terminal is the second request, or the second request comprises one or more of:

a real-name registration request;

an anonymous login request;

a request having a security level higher than a predefined security level;

a request of which a machine identification code is set for verification based on a randomized algorithm; and a request of which a machine identification code is set for verification according to a test cycle.

8. A terminal identification system comprising:

one or more processors; and a memory including instructions executable by the one or more processors, which when executed perform the following acts comprising:

receiving requests from a terminal;

obtaining and verifying a signature or a certificate of a trusted party for a machine identification code identifier of the terminal from the first request, after receiving a first request for which signature or certificate verification is to be performed from the terminal, wherein the machine identification code identifier is an identifier allocated by the trusted party to the machine identification code of the terminal, and wherein the signature or certificate of the trusted party includes a user identifier of the user and the machine identification code identifier of the terminal as information associated with the signature or certificate;

identifying the terminal using the machine identification code identifier obtained from the signature or certificate after the first verification module verifies that the signature or certificate is legitimate;

storing the machine identification code identifier of the terminal and a corresponding machine identification code or a derivative code thereof in a database;

the service network receiving, from the terminal, a second request of which machine identification code verification is to be performed;

the service network obtaining the machine identification code of the terminal and a signature or certificate from the second request, and after verifying that the signature or certificate is legitimate, querying the corresponding machine identification code or the derivative code in the database based on the machine identification code identifier obtained from the signature or certificate; and if the machine identification code or a derivative code obtained from the second request is different from the machine identification code or the derivative code that are found in a query, declining the request.

9. The terminal identification system as recited in claim 8, wherein the first request comprises an anonymous registration request and/or a real-name registration request.

10. The terminal identification system as recited in claim 9, wherein after identifying the terminal using the machine identification code identifier obtained from the signature or certificate and the terminal successfully logs in and establishes a session with the service network, the acts further comprise recording a correspondence relationship between the session and the machine identification code identifier, and identifying subsequent requests received via the session as requests sent from the terminal having the machine identification code identifier.

11. The terminal identification system as recited in claim 8, the acts further comprise:
initializing a registration process of the terminal machine identification code, when the signature or certificate from the first request is not obtained, by:
informing the terminal to report the machine identification code thereof, submitting the machine identification code reported by the terminal to the trusted party for registration, and sending a signature or certificate issued by the trusted party to the terminal for storage; or
prompting the terminal to submit the machine identification code thereof to the trusted party for registration through an interface of machine identification code registration provided by the network to obtain the signature or certificate issued by the trusted party for storage.

12. The terminal identification system as recited in claim 11, wherein sending the signature or certificate issued by the trusted party to the terminal for storage comprises sending the signature or certificate to the terminal for storage as a parameter to be included in the request sent by the terminal to the service network.

13. The terminal identification system as recited in claim 8, wherein after receiving a second request for which machine identification code verification is to be performed from the terminal, and verifying a signature or certificate thereof, and the acts further comprise:
storing the machine identification code identifier of the terminal and a corresponding machine identification code or a derivative code thereof;
querying the corresponding machine identification code or the derivative code in the database according to the machine identification code identifier obtained from the signature or certificate when the signature or certificate in the second request is confirmed to be legitimate, determining whether the machine identification code or the derivative code obtained from the second request is the same as the machine identification code or the derivative code that is found in a query, and setting a verification result of the machine identification code to indicate legitimacy if the same, or illegitimacy if otherwise; and
denying the request when a determination result indicates a difference.

14. The terminal identification system as recited in claim 13, wherein each request sent from the terminal is the second request, or the second request comprises one or more of:
a real-name registration request;
an anonymous registration request;
a request having a security level higher than a predefined security level;
a request of which a machine identification code is set for verification based on a randomized algorithm; and
a request of which a machine identification code is set for verification according to a test cycle.

15. A terminal identification method comprising:
receiving by a service network, from a terminal, a first request for which signature or certificate verification is to be performed;
obtaining by the service network a signature or a certificate of a trusted party for a machine identification code identifier of the terminal from the first request, wherein the machine identification code identifier is an identifier allocated by the trusted party to the machine identification code of the terminal; and
verifying by the service network, the obtained signature or certificate, and if the obtained signature or certificate is verified to be legitimate, identifying the terminal using the machine identification code identifier obtained from the signature or certificate;
storing the machine identification code identifier of the terminal and a corresponding machine identification code or a derivative code thereof in a database;
the service network receiving, from the terminal, a second request of which machine identification code verification is to be performed;
the service network obtaining the machine identification code of the terminal and a signature or certificate from the second request, and after verifying that the signature or certificate is legitimate, querying the corresponding machine identification code or the derivative code in the database based on the machine identification code identifier obtained from the signature or certificate; and
if the machine identification code or a derivative code obtained from the second request is different from the machine identification code or the derivative code that are found in a query, declining the request; and
initiating a registration process of the terminal machine identification code by the service network, if the service network does not obtain the signature or certificate from the first request, the registration process including:
the service network informing the terminal to report the machine identification code thereof, submitting the machine identification code reported by the terminal to the trusted party for registration, and sending a signature or certificate issued by the trusted party to the terminal for storage; or
the service network prompting the terminal to submit the machine identification code thereof to the trusted party for registration through an interface of machine identification code registration provided by the network to obtain and store the signature or certificate issued by the trusted party; and
the terminal submitting user information of a user and the machine identification code thereof to the trusted party for registration directly or via the service network, wherein the signature or certificate of the trusted party includes a user identifier of the user and the machine identification code identifier of the terminal as information associated with the signature or certificate.

* * * * *